US012722102B2

(12) United States Patent
Kraus et al.

(10) Patent No.: US 12,722,102 B2
(45) Date of Patent: Sep. 1, 2026

(54) CONTINUOUS AND RAPID PERPETUAL ELECTROSTATIC COALESCENCE PHASE SEPARATION AND DEMULSIFICATION OF OIL, WATER, AND SOLIDS USING PLASMA AT STANDARD CONDITIONS

(71) Applicant: The Texas A&M University System, College Station, TX (US)

(72) Inventors: Jamie Kraus, College Station, TX (US); David Staack, College Station, TX (US); Howard Jemison, Houston, TX (US)

(73) Assignees: THE TEXAS A&M UNIVERSITY SYSTEM, College Station, TX (US); LTEOIL LLC, Houston, TX (US)

( * ) Notice: Subject to any disclaimer, the term of this patent is extended or adjusted under 35 U.S.C. 154(b) by 0 days.

(21) Appl. No.: 18/319,653

(22) Filed: May 18, 2023

(65) Prior Publication Data

US 2023/0285877 A1 Sep. 14, 2023

Related U.S. Application Data

(63) Continuation of application No. PCT/US2022/053423, filed on Dec. 19, 2022.

(Continued)

(51) Int. Cl.

*B01D 17/04* (2006.01)
*B01D 17/06* (2006.01)

(Continued)

(52) U.S. Cl.

CPC ............ *B01D 17/04* (2013.01); *B01D 17/06* (2013.01); *B03C 11/00* (2013.01); *C02F 1/4608* (2013.01);

(Continued)

(58) Field of Classification Search

CPC ...... B01D 17/04; B01D 17/06; B01D 17/047; B01D 2259/80; B01D 2259/818;

(Continued)

(56) References Cited

U.S. PATENT DOCUMENTS 1,170,184 A * 2/1916 Peek, Jr. .................. C02F 1/48 204/671
2,033,418 A * 3/1936 Eddy ..................... C10G 33/02 204/668

(Continued)

OTHER PUBLICATIONS

Delgado, et al. "The scaling of kinetic and transport behaviors in the solution-phase chemistry of a plasma-liquid interface." Journal of Applied Physics 129.8 (Feb. 28, 2021).

(Continued)

*Primary Examiner* — Liam Royce
(74) *Attorney, Agent, or Firm* — Foley & Lardner LLP

(57) ABSTRACT

Provided are systems and methods involving a plasma electro-coalescence reactor. The reactor includes a set of ports configured to receive an emulsified mixture into the reactor, receive a non-oxidative gas into the reactor, expel oil from the reactor, and expel water from the reactor. The reactor includes a set of electrodes including a first electrode in a headspace of the reactor, and a second electrode, the set of electrodes configured to receive a voltage at or in excess of a breakdown voltage of the non-oxidative gas.

19 Claims, 10 Drawing Sheets

Related U.S. Application Data

(60) Provisional application No. 63/291,626, filed on Dec. 20, 2021.

(51) Int. Cl.
*B03C 11/00* (2006.01)
*C02F 1/46* (2023.01)
*C10G 33/02* (2006.01)

(52) U.S. Cl.
CPC .......... *C10G 33/02* (2013.01); *B01D 2259/80* (2013.01); *B01D 2259/818* (2013.01); *B03C 2201/02* (2013.01)

(58) Field of Classification Search
CPC ..... B03C 11/00; B03C 2201/02; C10G 33/02; C10G 33/06; B01J 19/08; B01J 19/088; B01J 2219/0805; B01J 2219/0807; B01J 2219/0809; B01J 2219/0894; H05H 1/02
See application file for complete search history.

(56) References Cited

U.S. PATENT DOCUMENTS 2,849,395 A * 8/1958 Wintermute .......... B01D 17/06 204/673
3,074,870 A * 1/1963 Carswell ............... C10G 33/02 204/674
3,662,892 A * 5/1972 Sorensen .......... B01D 17/0214 210/242.3
3,719,584 A * 3/1973 Turner ................... B03C 11/00 204/660
6,113,765 A 9/2000 Wagner et al.
2001/0047929 A1* 12/2001 Conrad ................ C01B 13/115 422/186.21
2005/0189278 A1* 9/2005 Iijima .................... C01B 13/11 210/205
2009/0134068 A1 5/2009 Falkiner et al.
2009/0205497 A1 8/2009 Morgan
2012/0085650 A1* 4/2012 Hartle ...................... B03C 3/68 204/554
2014/0360880 A1 12/2014 Mahmoudi et al.
2015/0291456 A1 10/2015 Findikoglu et al.
2022/0048795 A1* 2/2022 Gafri .................... C02F 1/4672

OTHER PUBLICATIONS

International Search Report and Written Opinion for PCT/US2022/03423 dated May 15, 2023.
Wang, et al. "Relative breakdown voltage and energy deposition in the liquid and gas phase of multiphase hydrocarbon plasmas." Journal of Applied Physics 129.12 (Mar. 28, 2021).

* cited by examiner

CONTINUOUS AND RAPID PERPETUAL ELECTROSTATIC COALESCENCE PHASE SEPARATION AND DEMULSIFICATION OF OIL, WATER, AND SOLIDS USING PLASMA AT STANDARD CONDITIONS

REFERENCE TO RELATED APPLICATIONS

The present application is a continuation of International Patent Application No. PCT/US2022/053423 filed Dec. 19, 2022, which claims priority to and the benefit of U.S. Provisional Patent Application No. 63/291,626 filed Dec. 20, 2021, both of which are incorporated herein by reference.

FIELD

The present technology generally relates to a systems, apparatuses, and processes related to demulsifying crude oil and other heavy liquid hydrocarbon materials using electric fields and plasma. The disclosed approach is applicable to, for example, hydrocarbon processing and oil spill remediation.

BACKGROUND

Oil may be emulsified with impurities, such as water, dirt, or salt. In order to separate oil from these impurities, oil separators may manipulate the emulsified mixture, such as by varying the temperature or by selectively agitating the mixture, to encourage the oil to separate, to increase the throughput of oil.

SUMMARY

In a first aspect, various embodiments of the present disclosure relate to a method comprising: feeding a non-oxidative gas into a headspace of a reactor; receiving an emulsified mixture into the reactor; energizing a set of electrodes to a voltage at or in excess of a breakdown voltage of the non-oxidative gas to separate oil and water from the emulsified mixture, wherein a first electrode of the set of electrodes is disposed in the headspace of the reactor; removing the oil and the water from the reactor.

In a second aspect, various embodiments relate to a system comprising a reactor, the reactor comprising: a set of ports configured to (i) receive an emulsified mixture into the reactor, (ii) receive a non-oxidative gas into the reactor, (iii) expel oil from the reactor, and (iv) expel water from the reactor; and a set of electrodes comprising a first electrode in a headspace of the reactor, and a second electrode, the set of electrodes configured to receive a voltage at or in excess of a breakdown voltage of the non-oxidative gas.

In a third aspect, various embodiments relate to a system, comprising: a reactor comprising: a set of ports configured to (i) receive an emulsified mixture into the reactor, (ii) receive a non-oxidative gas into the reactor, (iii) expel oil from the reactor, and (iv) expel water from the reactor; and a set of electrodes comprising a first electrode in a headspace of the reactor, and a second electrode, the set of electrodes configured to receive a voltage at or in excess of a breakdown voltage of the non-oxidative gas; and an energy source, comprising: a first terminal electrically connected to the first electrode; and a second terminal electrically connected to the second electrode; wherein the energy source is configured to generate the voltage between the first terminal and the second terminal in excess of a dielectric breakdown of the non-oxidative gas in the headspace of the reactor.

In other aspects, various embodiments relate to systems devices for performing any of the methods disclosed herein, and to methods that may be performed by the systems and devices disclosed herein.

DETAILED DESCRIPTION

Figure 1:
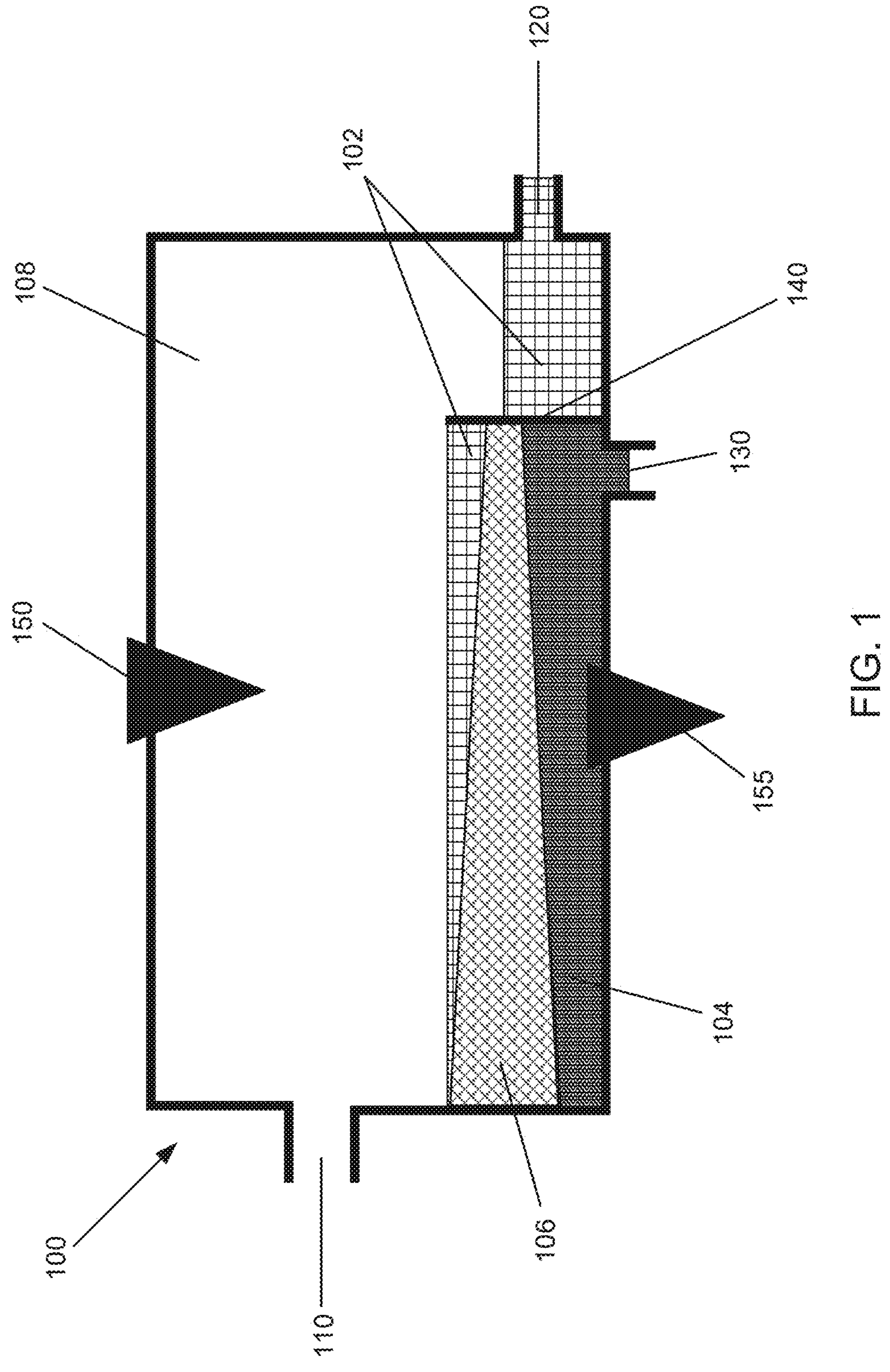
FIG. 1 discloses a cutaway view of an example operating plasma electro-coalescence reactor, according to various potential embodiments.

An approach to oil separation uses electrostatic coalescers that apply an electric field to a mixture of oil with impurities, which may polarize the oil and water droplets within it in order to encourage their coalescence. Higher voltages may increase the rate of coalescence according to the higher electric fields disposed across molecules (e.g., across dipoles). However, increased voltages carry a risk of arcing and flashover which may destroy or otherwise damage the system or ignite the mixture, gas, oil, etc., resulting in undesirable chemical reactions. A reactor containing a sufficient quantity of non-oxidizing gas may allow for higher voltages without arcing, flashover, or ignition of the non-oxidizing gas or the emulsified mixture (e.g., because of a lack of an oxidizer available for combustion or an oxidation process), allowing for higher electric fields relative to atmospheric air reactors. Additionally, an electrode connected to a power supply is configured to generate an electric field and thereby ionize the non-oxidative gas to beneficially generate plasma, to chemically alter the mixture and thereby induce, for example, anti-microbial and surfactant properties. The chemical alteration may include polymerization of, for example, certain non-oxidizing gases. The configuration and properties of this plasma may be controlled to prevent undesirable arcing or flashover, as further discussed below.

A hydrocarbon processing system may include a reactor body that may be composed of a non-conductive material such as plastic or ceramics, which may, advantageously, avoid undesirable arcing with its electrical components.

Some embodiments may, alternatively or additionally, be composed of conductive material such as steel which may, advantageously, increase durability and maintainability of the vessel. A conductive vessel (or a portion thereof) may be maintained at a high voltage, at ground, allowed to float, etc. At least one pair of electrodes may be disposed within the reactor, and be attached to a voltage potential sufficient to cause the dielectric breakdown of the non-oxidizing gas, which one skilled in the art will understand will vary according to the makeup of the particular gas, its pressure, a geometry of each electrode, a distance between the electrodes, etc. In various embodiments, another advantage as compared to conventional systems is also an ability to treat at higher voltages, thereby increasing the coalescence efficiency per unit volume processed. Such voltages can be compared to conventional electric coalescers that treat at lower voltages, so they must upscale in size and in doing so increase cost, size, materials used, and the like.

In some instances (e.g., certain oil production facilities), a non-oxidizing gas (e.g., conventional natural gas, shale gas, biogas, etc.) may be available from the oil reservoir, and it may be desirable to harvest this gas, such as by the use of a pumping loop. As used herein, non-oxidative (used interchangeably with non-oxidizing) gas is gas that has sufficiently low levels of oxygen sources, which may be molecular oxygen ($O_2$) or another oxygen source, or other no oxygen sources, such that chemical oxidation is minimized, or such that chemical oxidation is maintained sufficiently low so as not to interfere with the intended chemical processes. For example, a voltage may exceed a dielectric breakdown of the gas to without causing arcing which may generate plasma, whereas the presence of an oxidizer may result in combustion or an oxidation reaction. Natural gas may be a commercially available utility gas, gas stored in a natural reservoir, or another gas comprising at least one of methane, ethane, butane, or propane. In some instances (e.g. certain oil spill remediation efforts), other gases such as $N_2$ or $CO_2$, which may be more readily available may be employed. In some embodiments, the reactor may be pressurized in excess of the ambient environment, (e.g., ten to fifteen pounds per square inch gauge ("PSIG")). Advantageously, such embodiments may better resist infiltration of oxidizing gases, and increase the available gas particles available for the ionization process, and increased polymerization (e.g., a density of gas particles along a gas-liquid interface). Polymerization of the light gases into liquid hydrocarbon is a permanent gas to liquid (GTL) conversion process. In some embodiments, the gas may be recirculated through the reactor in order to reduce the need for external gas supply, or cumulatively treat the gas changing its composition and increasing the rate of reactions such as polymerization. Such recirculation may be combined with pressure regulation (e.g., by the use of a pressure regulating air pump). The regulated pressure of the gas supply may be used to stabilize the liquid level interface and induce liquid phase chemistry.

An emulsified mixture of oil with, for example, salt, dirt, and/or water may enter a port of the reactor body. The electrodes may be energized, either prior to or after the mixture enters the body. In some embodiments, the voltage between the electrodes may be maintained at a relatively steady level (e.g., with relatively low deviation from a certain voltage) while the emulsified mixture may continuously enter the reactor at a flow rate which results in continuous separation of the oil. In some embodiments, the reactor may operate in batches, alternatively filling the reactor, processing the mixture in the reactor, removing one or more components from the reactor, and re-filling the reactor. The electrodes may ionize the non-oxidative gas, whereby the voltage causes electrons to be stripped from hydrogen sources (e.g., $H_2$, $CH_4$, or the like) and apply an electric potential across the mixture, leading various components of the mixture to coalesce, and separate from the mixture. For example, a portion of the mixture may remain emulsified (i.e., a "rag layer"), while a portion of the oil may coalesce and rise to the top of the mixture. Sediment such as dirt and salt may fall to the bottom, and water may be disposed in between the oil and the remaining mixture.

In various embodiments, the electrodes in the reactor are connected to a high voltage circuit of an energy source. There may be multiple energy sources individually controlling separate electrode pairs or a single energy source may be configured to supply multiple pairs of electrodes. The high voltage electrical circuit may be configured to prevent high localized and high current density electric discharges within the reactor. In one embodiment this is achieved through a network of ballast resistors, although one skilled in the art will understand that similar effects can be achieved by pulsing of the high voltage circuit and/or using transistors, spark gap switches, inductors, and similar components to limit the intensity, duration, or frequency of high current discharge events. In some embodiments, the electrode and circuit configuration is chosen to spread the gas phase discharge out over the liquid surface. In some embodiments the electrode and circuit configuration is chosen to be sufficiently intense to generate a high plasma density and high reaction rate of plasma-chemical processes. In various embodiments, electron densities may be between $10^{11}$ and $10^{18}$ electrons per cubic centimeter, and initiate up to $10^{34}$ reactions per second per cubic centimeter.

In some embodiments, outlet valves may be disposed to align above and below the rag layer to allow water and/or oil to exit the reactor. In some embodiments, a weir may be disposed within the reactor body to allow oil and/or water to exit the reactor, without allowing the rag layer to exit the reactor. In some embodiments, the reactor may allow the separated mixture to exit the reactor for later processing, such as skimming, outside of the reactor. Some embodiments may contain controllers to monitor the level of the water, oil, and mixture within the reactor. Some controllers may control the process, such as by the injection of additional water into the reactor or an oil reservoir (e.g., water flooding), by adjusting the position of one or more weirs, or by adjusting the flow rate of the mixture or any component thereof, into or out of the reactor.

FIG. 1 represents a plasma electro-coalescence reactor 100. The reactor contains first port 110, which may be used as an input which may receive a mixture (e.g., oil, water, and non-oxidizing gas). A headspace of the electro-coalescence reactor 100 includes a gas-phase portion of the contents of the electro-coalescence reactor 100. For example, the headspace can intermediate any reactor fluid disposed in the electro-coalescence reactor 100 and an upper surface of an inner portion of the electro-coalescence reactor 100 such that an increase of a level of reactor fluid may cause a corresponding decrease in a headspace volume. The first port 110 can be disposed at a level of a headspace of the reactor (e.g., to avoid backflow), or below the headspace (e.g., to avoid headspace depressurization). In some embodiments, additional ports may be provided for the emulsified liquid and the non-oxidizing gas. Beneficially, this may simplify the recirculation of the gas, such as by a regulated valve which may be used alone or in conjunction with a pump. A first electrode 150 is disposed opposite a second electrode 155. In some embodiments, the first electrode 150 may be energized to a high voltage, the second electrode may be energized to a lower voltage (e.g., ground) and the geometry (e.g., a point facing the second electrode 155) of the first electrode 150 may encourage plasma discharge (e.g., a generation of ions from the electric field, or the acceleration of the ions along the electric field). Some embodiments may reverse the polarity of the electrodes, or use another voltage for the second electrode which may, beneficially, detect conduction between the second electrode and a ground reference which may be undesirable, for example, due to grounding concerns. For example, a ground fault detection circuit can intermediate one or more electrodes and one or more grounds. The second electrode 155 may likewise contain points facing the first electrode in some embodiments. Points can include any features protruding in a direction towards a corresponding electrode, which may reduce an inter-electrode distance relative to other portions of the electrodes. Some embodiments may make use of multiple first electrodes 150, or a first electrode containing multiple points. The second electrode 155, or its points, may also be duplicated in some reactor designs. In some embodiments, the second electrode 155 may be a conductive meshed sheet, or include other openings to allow a passage of reactor fluid there through. Advantageously, such a meshed sheet may allow the mixture and/or its component parts ("reactor fluid") to permeate the sheet, while allowing the plasma to reach the second electrode by following conductive paths within the reactor fluid. In some embodiments, the distance between the first electrode and the second electrode may be adjustable, such as based on the composition and level of the reactor fluid or upon an electrode height adjustment. For example, a mechanical adjustment such as a screw, motor, or other mechanism can adjust an electrode location. In some embodiments, the controller can engage the mechanism to adjust the height of the electrode. For example, the controller can adjust the lower electrode responsive to a rag layer position, such that the electrode-reactor fluid interface can include a water phase, rag layer, or oil phase.

The reactor fluid may comprise an oil layer 102, which may rise to the top of the reactor fluid, and a water layer 104, which may sink below a rag layer 106, which may comprise oil mixed with water. One skilled in the art will understand that the various layers of the reactor fluid may not be completely separated (e.g. the oil layer may contain some water, salts, etc.; the water layer may contain some oil, salts, etc.), but are characterized by a transition from a mostly water medium with oil droplets to a mostly oil medium with water droplets. References to oil and water throughout are not intended to imply complete separation, or pure oil or water with no impurity. Generally, in emulsifications, the buoyant forces due to the density difference of the oil and water phases may, in some instances, be insufficient to overcome surface tension, charges and other attractive forces maintaining the emulsion on a desired timescale. The reactor fluid may also contain sediments (e.g., salts and dirt) and bacteria. The addition of stronger electrostatic and electrodynamics forces due to the application of an electric field, and pondermotive forces due to gradients in the electric field and changes in the dielectric constants of the mediums can provide additional forces to accelerate the motion of droplets. Furthermore, the application of electric charges to the droplets (e.g., oil and water) may hasten their polarization and coalescence. A larger electric field, and more charges deposited into the droplets may result in a more rapid and intense separation and coalescence process. The sediments may also fall out of solution (e.g., due to gravity, polar forces, etc.) and collect, for example, at the bottom of the reactor. The sediments may also experience an electric field and associated forces, or accumulate a charge, hastening separation. The reactor may comprise a panel to remove said sediments. In some embodiments, the reactor may contain a weir 140. The weir may be disposed to allow the oil layer 102 to flow over the weir by, for example, adjusting the height of the weir, which may be performed by the controller by actuating a mechanical adjustment via a motor. The controller can further adjust the flow rate of the reactor fluid, or the release of the water layer 104, such as through a second port 130, (e.g., a water release) controlled by a mechanically or electrically controlled valve. For example, the controller can actuate the valve based on the level of the reactor fluid such as to maintain or adjust said level, or the water content of the reactor fluid at one or more locations within the reactor. A third port 120 may allow the oil to exit the reactor. In some embodiments, the reactor (e.g., a controller thereof) may allow oil and water to exit from the same port, for example, in an alternating fashion, or in a slow flow that maintains separation for later processing. In some embodiments (e.g., a reactor operated in a batch mode) the port(s) which allow reactor fluid to enter the reactor may also be used to allow reactor fluid to exit the reactor. For example, a controller can actuate one or more pumps or valves to cause reactor fluids to enter or exit the reactor.

The reactor may also contain a gas head space 108 which may contain a non-oxidative gas. The non-oxidative gas may comprise one or more constituent gases, such as $CO_2$ and methane. One skilled in the art will understand that the headspace may comprise some quantity of oxidative gas, such as $O_2$, the amount of which may depend, for example, on the construction of the reactor and the pressure of the gas. For example, one embodiment of the reactor may tolerate up to about 2% $O_2$ in the reactor headspace during operation. Essentially the level of oxidant in the mixture should be a safety factor (typically about 2) times less than the combustion limit for the operating gas mixture at operating pressure and temperature in various embodiments. When the electrodes are energized, a breakdown of the dielectric properties of the gas may occur, resulting in plasma being emitted from, for example, the first electrode 150 and in the direction of, for example, the second electrode 155. The electric field arising from a difference in potential between the electrodes may result in (e.g., water and oil) droplets in the reactor fluid coalescing into larger droplets, and the larger oil droplets rising out of the emulsified mixture at a higher rate than a design which does not exceed breakdown, because of the higher available voltage and electric field. Similar processes may happen to water droplets in the oil phase. Beneficially, arcing that would lead to combustion is reduced, minimized, or eliminated through the disclosed approach. Additionally, the operation above the breakdown voltage may result in non-oxidative plasma which may form surfactants and/or demulsifier molecules, which may further aid the separation of the oil and water, and may, advantageously, operate as an anti-microbial agent within the reactor fluid.

Figure 2:
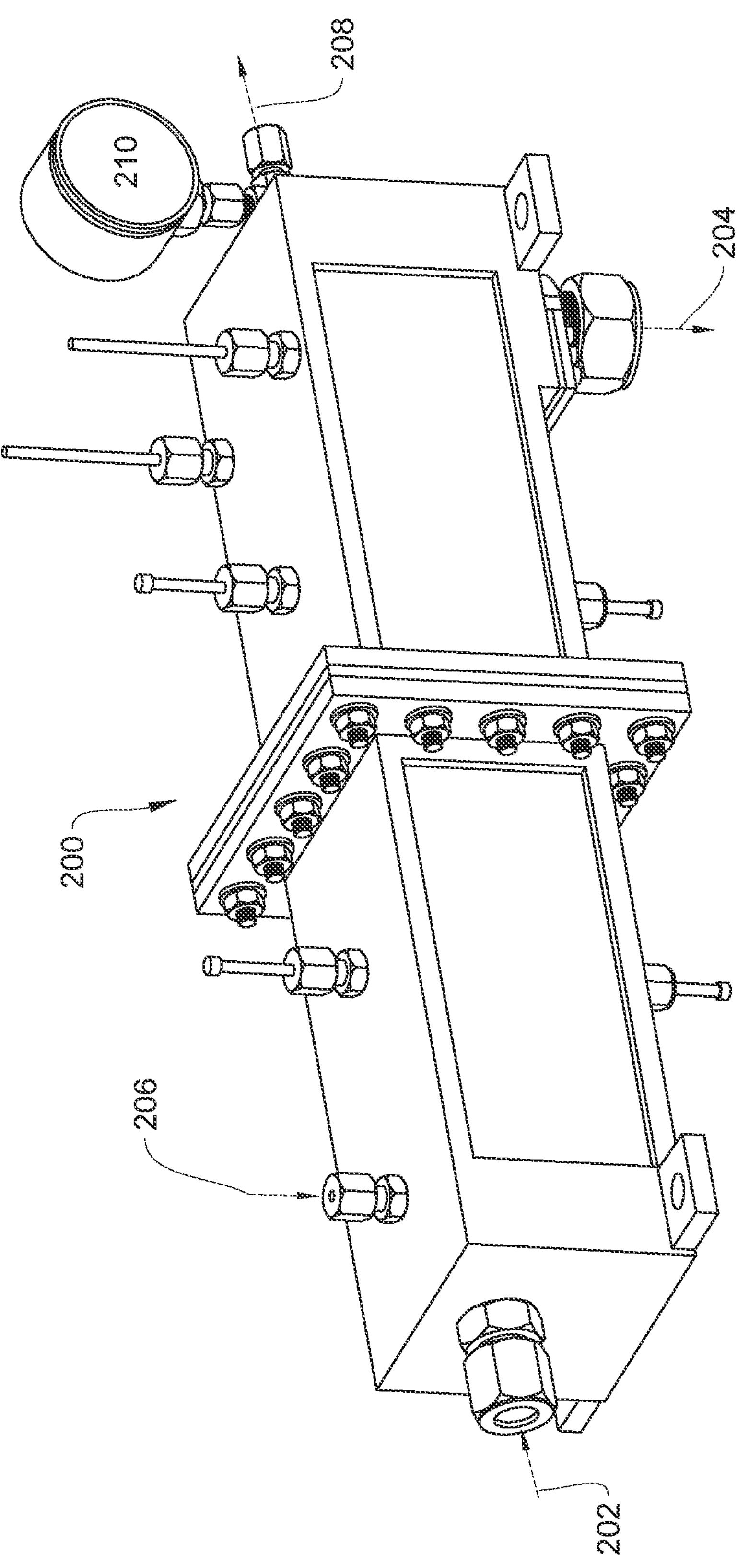
FIG. 2 discloses an example of a plasma electro-coalescence reactor, according to various potential embodiments.

FIG. 2 discloses an example of a plasma electro-coalescence reactor 200, according to various potential embodiments. The reactor 200 contains a first port 202 to allow an emulsified mixture to enter the reactor 200, as well as a second port 204 to allow the separated oil, water, and solids to exit the reactor 200. The emulsified mixture can have a range of densities according to a water or sediment content thereof. For example, a density of an emulsified mixture may be about 965 kg/m^3, 954 kg/m^3, 947 kg/m^3, or 937 kg/m^3 depending on its specific content. A dewatered oil or emulsified mixture can have a density of about 920 kg/m^3, or the like. One skilled in the art will understand that an emulsified mixture can vary according to a location, well water content, extraction method, or the like. For example, Saudi or Permian Basin oil may so vary. In some embodiments, the reactor 200 can include various second ports 204 such as a port to expel water from the reactor and a port to expel oil from the reactor 200, separate from the port to expel water. In some embodiments, a sediment port can expel sediments from the reactor. For example the sediment port can include or interface with a sediment collection area, filter, cover plate, valve, or the like which is removably attached to the reactor such that the port can be selectively removed, opened, or otherwise actuated (e.g., by or via a controller) to remove sediments from the reactor 200. In some embodiments, a single phase separation output can alternate between expelling water, oil, or the like. In some embodiments, a controller can actuate one or more ports responsive to a detected condition of the reactor or the contents thereof. For example, the controller may open, close, or otherwise actuate the first port 202 to adjust a flow rate of an emulsified material into the reactor 200 responsive to a level of material in the reactor, a pressure of the headspace of the reactor, so as to regulate a water content of oil. The controller may open, close, or otherwise actuate the second port 204 to adjust a flow rate of one or more materials from the reactor (e.g., water, oil, a rag layer, solids, etc.) responsive to a level of material in the reactor, a pressure of the headspace of the reactor, or the like. For example, the level of the material can be a proportion or quantity (e.g., mass, volume, etc.) of solids, a rag layer, oil, water, etc.

The reactor 200 may contain a gas input 206, which allows a non-oxidative gas to enter the reactor 200. For example, a wellhead or other source can feed the non-oxidative gas into the reactor 200. The gas input 206 can include or interface with an element to separate the non-oxidative gas from oxidizers (e.g., atmospheric oxygen). For example, the gas input can include or interface with a flame or reactant prior to entering the chamber, or adjust a flow rate (e.g., close) in response to a detected oxygen level in excess of a threshold (e.g., a combustion threshold). The gas input 206 or gas outlet port 208, can include a pressure regulator 210 which may maintain the gas headspace in adjusting a flow rate of a gas into or out of the reactor 200 at a given pressure. In various embodiments, pressure would be near ambient pressure. In various embodiments, pressure could be any suitable pressure, such as 15 psi above ambient, a well production pressure, or a pressure near the delivery pressure to the raw gas uptake pipelines. The controller may determine the pressure, for example, based on the emulsified mixture, the reactor fluid level, the available gas, or the surfactant level within the reactor fluid. In some embodiments, the controller may use the gas pressure to control the flow of the emulsified mixture into the reactor (e.g., into the first port). For example, a pressure regulator 210 disposed over the gas outlet port may increase a pressure of the headspace of the reactor to decrease a flow rate into the reactor 200 or decrease a pressure of the headspace to increase a flow rate into the reactor 200.

In some embodiments the non-oxidative gas is entrained with the liquid flow and/or dissolved within the liquid at down-hole pressures (i.e., in the reservoir itself) and coming out of solution as a separate phase in a lower-pressure reactor, such as for reservoirs including oil and natural gas. For example, the third port and the first port can be a same port of the reactor 200, or the first port can provide gas in addition to the gas received by the third port. Some embodiments may return all or a portion of the gas which exits the gas outlet port to a gas inlet port which is configured to receive a gas into the reactor. These molecules may, advantageously, enhance oil recovery by accelerating the separation of components of the emulsified mixture. The plasma discharge within the gas phase can promote chemical reactions between the gas phase molecules and between the gas phase and liquid phase molecules such as by bombarding the surface of reactor fluid with high energy ions. These reactive species may combine with large species forming new species in processes of cross linking and addition and can also convert into smaller liquid fuel molecules such as gasoline or diesel during treatment through a process of cracking, substitution, radical termination, etc. The encounter of a radical (such a methyl radical) with a stable molecule is known to initiate various possible pathways. This could include breaking of a C—C bond and cracking to smaller molecules. Similarly, a C—H bond could be broken, leading to a cross-linking reaction or a disproportionation reaction. All these various pathways exist with relative selectivity based upon the radical, pressure, and temperatures (gas temperature, electron temperature, and vibrational temperature). Non-equilibrium reactions are favored by high electron and vibrational temperature and low gas and neutral species temperature. Non-equilibrium reactions can favor gas to liquid conversion and cracking reactions.

Figure 3:
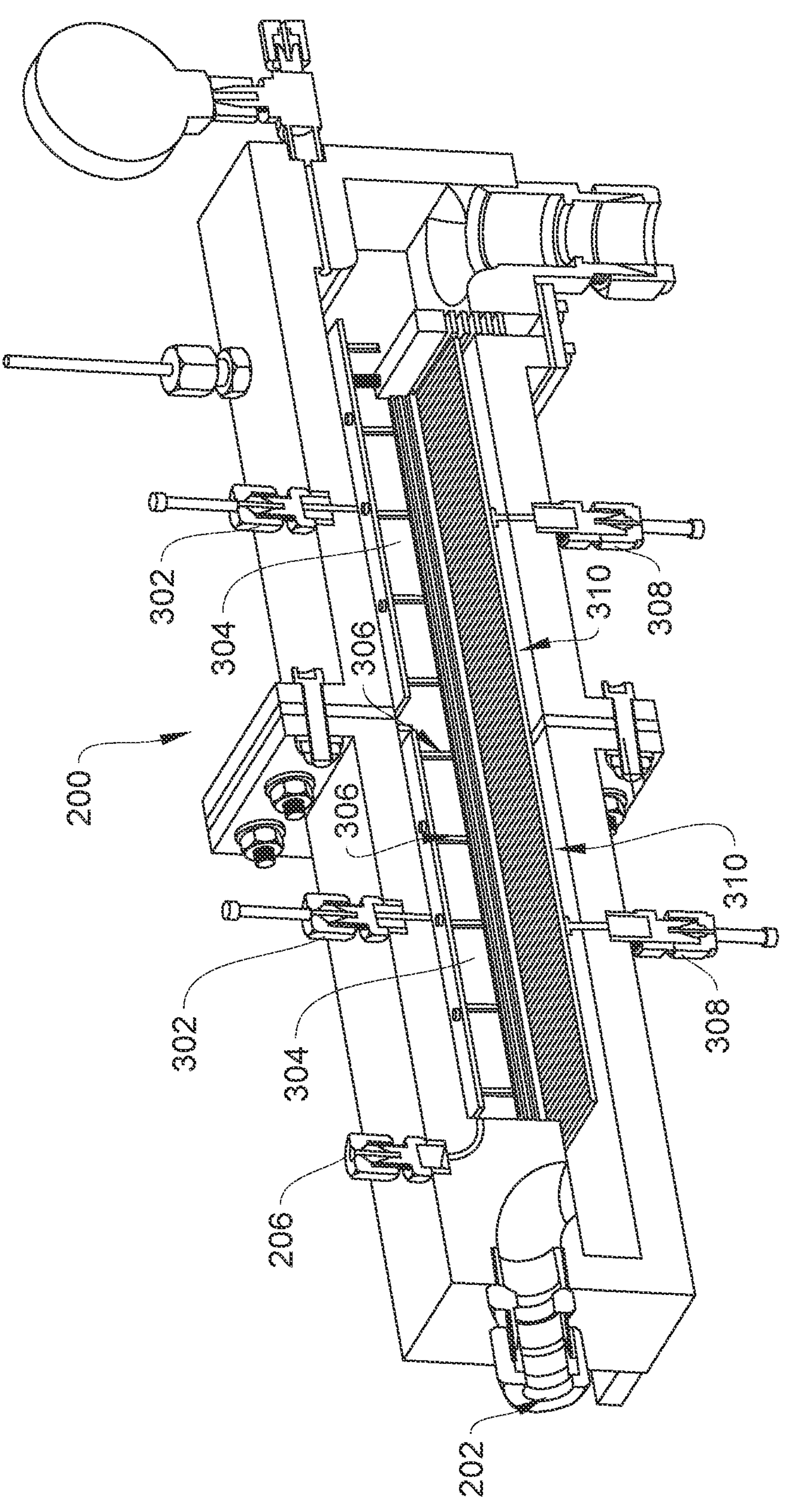
FIG. 3 discloses a cutaway drawing of an example plasma electro-coalescence reactor, according to various potential embodiments.

FIG. 3, a cutaway drawing of an example plasma electrocoalescence reactor 200, displays first electrodes 302 which may be energized to a voltage that causes a dielectric breakdown of the headspace gas, for example, 25 kV, or 10 kV to 40 kV. One skilled in the art will understand that the voltage may be varied based on the geometry of the reactor (e.g., the distance between the electrodes, such that higher voltages would be employed with higher distances), the composition of the reactor fluid and the gas (e.g., different gases and pressures may have different breakdown voltages), the flow rate (e.g., a higher flow rate may warrant more plasma discharge), etc. The first electrodes 302 comprise their inputs, shown passing through the body of the reactor 200, as well as sheets 304 constructed of a conductive material (e.g., brass, silver, nickel, and/or aluminum which may be selected based on their resistance to corrosion when interfacing with oils, salts, plasmas, etc.) with several points 306 extending toward second electrodes 308 which may be connected to a reference ground. The first electrodes 302 may be configured to interface with the non-oxidizing gas in a headspace of the reactor 200. Such an electrode may cause a plasma discharge in the headspace. In various embodiments, another electrode is disposed within the reactor fluid, such that a plasma discharge may cross the gas-liquid boundary, bombarding the liquid with plasma (such as ionized hydrogen derived from the gas-phase). For example, the first electrodes 302 can include one or more points configured to generate plasma in hydrogen-comprising gasses such as methane, dihydrogen ($H_2$), or the like. The first electrodes 302 may be electrically connected or isolated from other electrode pairs, and may be connected to one or more voltage sources. In some embodiments, additional or fewer first electrodes 302 may be employed in a reactor 200.

The second electrodes 308 comprise their input which can receive a connection from a terminal connector of an energy source, shown passing through the body of the reactor 200, and mesh or slotted sheets 310, which are composed from a conductive material (e.g., brass, silver, nickel, and/or aluminum which may be selected based on their resistance to corrosion when interfacing with oils, salts, plasmas, etc.). The second electrode may be configured to interface with a reactor fluid such as oil, water, a rag layer, sediments, or the like. For example, the second electrode may be disposed outside of a headspace of a reactor (e.g., during operation there). As discussed above, such a configuration can cause the plasma to interact with the liquid-gas interface. The metals may be chosen because they have low temperature plasma catalytic properties. Slots or other openings of the sheets 310 may allow reactor fluid to pass through the sheets 310, which may permit a separation of components of the emulsified mixture through the electrode. In other embodiments, the sheets may be formed in order to better separate the fluid (e.g. as "V" channels). The second electrodes 308 may be electrically connected or isolated, and may be connected to one or more voltage sources. In some embodiments, additional or fewer second electrodes 308 may be employed in a reactor 200.

The material(s) of the first electrodes 302 and second electrodes 308 may be the same or may differ from each other. For example, if portions of the second electrodes 308 are designed for submersion and portions of the first electrodes 302 are not, a different material may be selected to interface (e.g., avoid corrosion) with their respective environments. In some embodiments, the distance between the second electrodes 308, and the voltage of the electrodes may be constant. In other embodiments, the distance may not be constant. For example, in some embodiments, the electrodes (or portions of an electrode) may be closer to each other towards a second port of the reactor, based, for example, on a narrower rag layer at that point. Alternatively, or in addition, the bottom or top of the reactor may be sloped, "V" shaped, etc. In some embodiments, the separation between the electrodes, or a portion thereof, may be adjustable. For example, the controller may instruct an actuator to move one or more electrodes to adjust separations therebetween.

Figure 4:
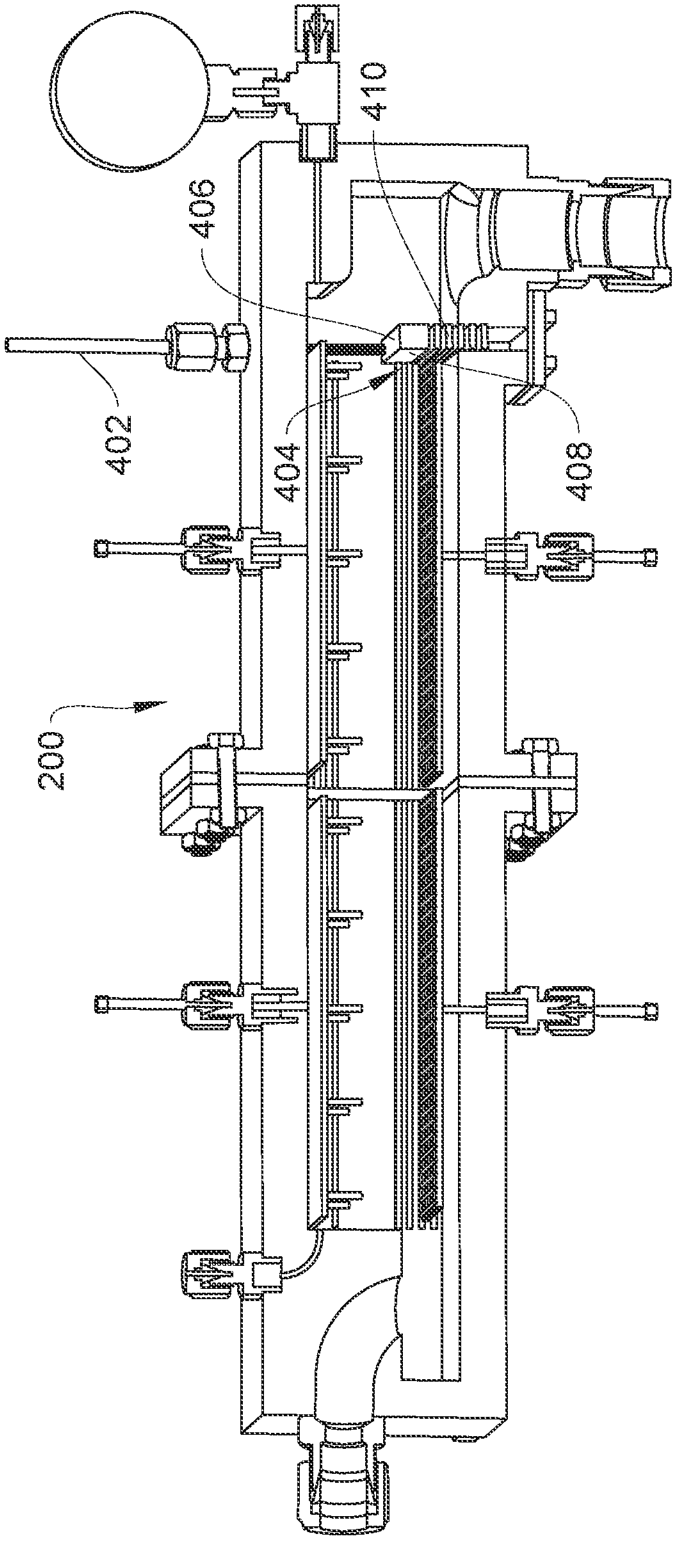
FIG. 4 discloses another cutaway drawing of an example plasma electro-coalescence reactor, according to various potential embodiments.

FIG. 4 discloses another cutaway drawing of an example plasma electro-coalescence reactor. The reactor contains a weir adjustment rod 402 which a controller may use to adjust the height of the weir 404. For example, a controller may adjust the weir 404 higher or lower to block the rag layer from exiting the reactor, or in order to control the flow rate. The weir position may also be used to control the liquid-gas interface height relative to the electrodes and other reactor components. For example, lowering a weir may increase a distance between a surface of the emulsified mixture and the first electrode, which may increase a breakdown voltage thereof. In some embodiments, the weir 404 may be non-adjustable, such that oil, water, and the like can be expelled according to a flow rate thereof. The adjustment rod is not intended to limit the adjustability of the weir. Various adjustment mechanisms can be employed, according to various embodiments.

The weir 404 can include an upper surface 406. In various embodiments, the height of the weir may be adjustable to permit oil disposed along an upper surface of the reactor fluid to pass over the weir 404 and exit the reactor. The weir 404 can include a blocking surface 408 to interface with (e.g., to block) a rag layer from transiting the weir 404. The size or location of the blocking surface 408 can be configured or adjusted (e.g., via the controller) based on a composition of reactor fluid (e.g., or a thickness or position of the weir 404). For example, the controller may adjust the blocking surface to allow the egress of separated oil or water while maintaining rag layer separation. The weir 404 can include one or more openings 410 for water, sediment, or the like to bypass the weir 404. Such separation of constituent components of the emulsified mixture can be termed as mechanical separation thereof. Water or sediment can pass through the openings 410 to a same port as, or a different port from, the oil for processing, removal, recycling, or the like.

Figure 5:
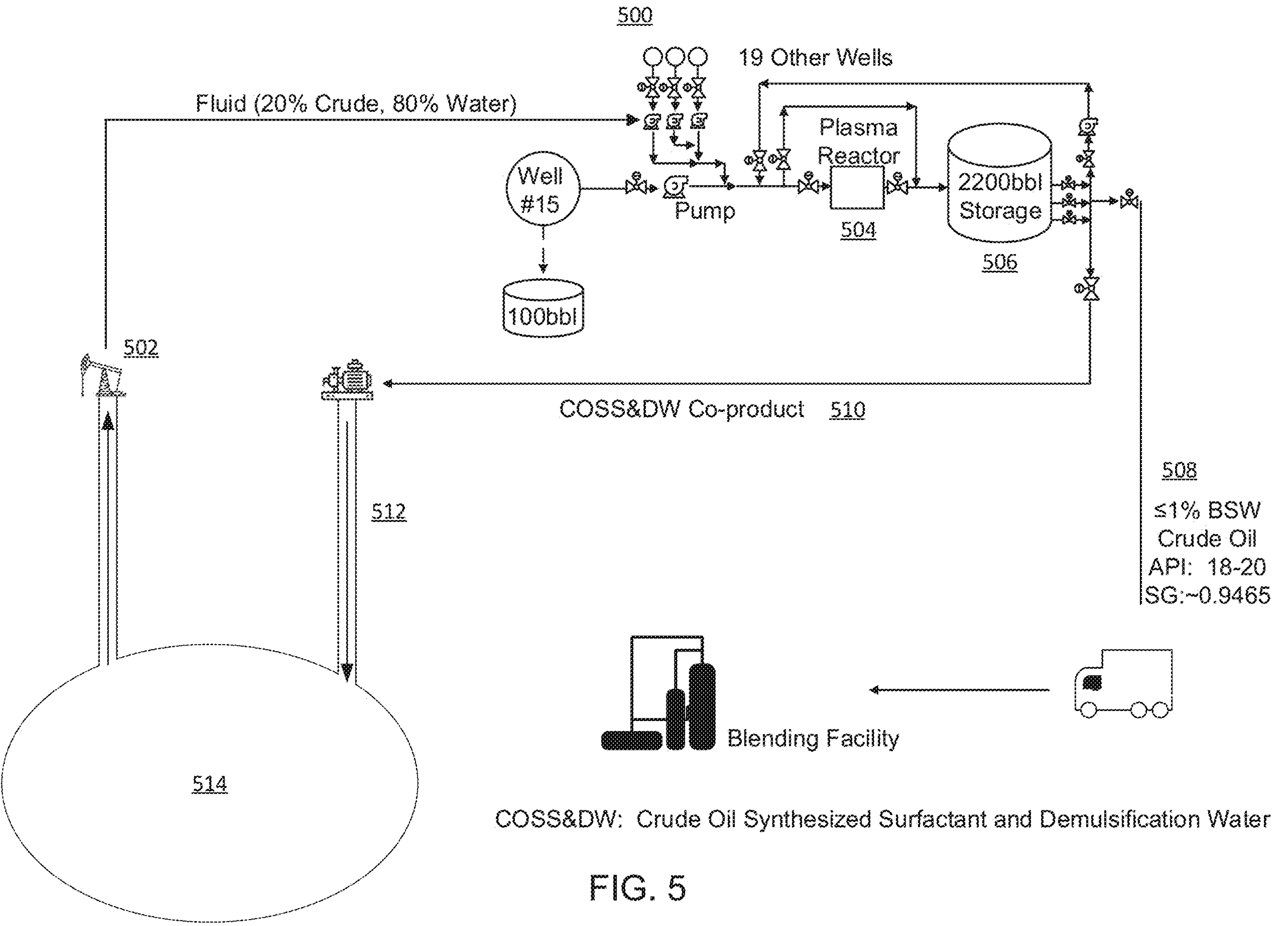
FIG. 5 depicts a method employing a plasma electro-coalescence reactor, according to various potential embodiments.

FIG. 5 discloses a method 500 of recovering oil from a subterranean/underground source. In other embodiments, oil may be recovered from another source such as sand on a beach following an oil spill. In yet other embodiments an oil water mixture may be recovered from an oil seep, plume, film, tarballs or mat, on a body of water following an oil spill. An emulsified mixture is removed from the ground at operation 502. The emulsified mixture may be naturally occurring, or resulting from the infusion of water into a store of oil "water flooded." For example, a reactor or other device can determine a specific gravity, viscosity, or other indicia of a water content of an emulsified mixture and, responsive to the determination, provide a quantity of water to adjust a relative percentage, pressure, or other condition of a reservoir. The water can include distilled or treated water, such as water removed by the reactor of FIGS. 1-4. The operation can produce oil, water, gas, and heterogeneous emulsified mixtures of these components at various relative weight percentages.

Operation 504 may comprise processing the emulsified mixture by a reactor, for example, any of the reactors disclosed by FIGS. 1-4 can be employed, resulting in demulsifiers and surfactants which may be contained in the oil, the water, or the gas and which can include or be termed as "beneficial by-products." For example, low boiling point products like butane and propanol may be present in both the gas and liquid phases. Plasma synthesized precursors for liquid phase products may also be present in the gas phase, such that recycling the gas may promote the formation of additional liquid phase products. The emulsified mixture or products derived therefrom can undergo production tests such as testing gravity, components, viscosity, or the like. Any of the operations of the oil recovery at operation 502 or the processing at operation 504 can be adjusted based on the testing. For example, testing can be performed during the processing in situ in a reactor, or thereafter. For example, a separation of an emulsified mixture in the minutes, hours, or days following expulsion from the reactor can be tested. The emulsified mixture or products derived therefrom can be combined, such as to expose oil derived from further wells with beneficial by-products of the operation 504.

The water and beneficial-by-product mixture ("plasma enhanced water") may add significant functional and monetary value to the water relative to untreated produced water. This plasma enhanced water may contain chemicals which can facilitate separation of oil from water, oil from sane, or oil from reservoir rock in enhanced oil recovery operations. Such chemicals may, in some embodiments, be synthesized from the existing water and oil without the addition of external chemicals, based on the supplied electrical energy. In some embodiments, the plasma enhanced water and process does not employ additional chemical additives and obviates or reduces the need for externally supplied chemicals. In another embodiment, chemical additives may be used in combination with the plasma process, and may synergistically enhance the phase separation process and further enhance the functionality and value of the plasma enhanced water.

The electrical energy can be attained from power transmission lines or produced onsite near the reactor through the use various sources for example: solar, wind, thermal, fossil or bio-fuel generator. In some embodiments, produced gases and gases liberated by the plasma reactor may be used in an engine to provide electrical power to the plasma reactor.

In some embodiments, the processing reactor is located at the surface adjacent to a production well head. In some embodiments the processing reactor is located at a collection and storage facility where oil from multiple productions wells may be gathered. In yet another embodiment the processing reactor is placed within the well or downhole. In various embodiments, the operations of FIG. 5 can be performed at or across various positions, such that a temperature, composition, or other property can vary therebetween. A production test site, well, reactor, or storage facility can vary in distance and a composition (e.g., emulsification, temperature, or gravity) may vary between the locations according to an environment thereof or a mixing or separation of the emulsified mixture. For example, an emulsified mixture can have an American Petroleum Institute (API) gravity of about 16 and a temperature of less than 100° C. (e.g., about 15° C., about 43° C., or the like). This process could work on an API oil or emulsion. Typically separation processes are harder on low (API 5 to API 30) oil mixtures and oils.

A constituent part of the reactor fluid (e.g. the oil, gas, beneficial byproducts, purified water, etc.) may be stored, at operation 506, for eventual sale or transportation, at operation 508. A lower grade oil may have an API weight of between about 5 and about 20 during storage or transportation. A higher grade oil may have an API weight of 20 to 50. The oil may have a basic sediment and water (BSS) content of less than 5%. For example, a BSS can be less than 1%. The oil may have a specific gravity of about 0.85 to 1.1. Another constituent part of the reactor fluid (e.g. wastewater, plasma enhanced water, beneficial by-products, etc.) may, at operation 510, be stored or returned to an oil field, which may include injecting the fluid into a underground/subterranean well. At operation 512, the water (or other beneficial byproduct) reenters a well, via injection by pumping, gravity, etc., until reaching the oil reservoir. At operation 514, the beneficial byproduct (e.g. resulting from the operation of water pressure, temperature, chemical impact of surfactants, etc.) may free additional oil from, for example, reservoir rock which may then be returned, as an emulsified mixture (e.g. by the controller via pumping) at operation 502, into a production well and to the surface. For example, a wettability of the water can be adjusted (e.g., to a contact angle of about 15°, in view of a similar contact angle of 45° for distilled water under similar conditions). By repeated cycling of the plasma enhanced water, larger amounts of beneficial by-products may enter the reservoir, and increase the useful life of a well, which may result in an increased proportion of oil produced from the formation/reservoir, further enhancement of the water and additional beneficial byproducts. Alternatively, a portion of the beneficial byproducts could be removed (e.g. to enable their sale or comply with environmental requirements).

In some disclosed embodiments, the emulsified mixture can be 80% water, and 20% crude. The mixture fraction can change and vary depending on the use and power of the waterflood or other enhanced oil recovery methods (i.e. the injected flowrate, rock permeability, etc.). The fraction can vary significantly based on an age of the production site; typically, newer sites have a higher crude fraction and older sites have higher water fraction. Some embodiments may operate with any percent mixture. Some embodiments may make use of different mixtures. For example, late in the life-cycle of an oil well, increased proportions of water may increase the life of an oil well. Additionally, oil spill remediation efforts may process mixtures approaching 100% water, in latter stages of certain cleanup efforts. In some embodiments, the emulsified mixture can include treated or untreated water injected subsequent to a removal from a reservoir at operation 502.

Figure 6:
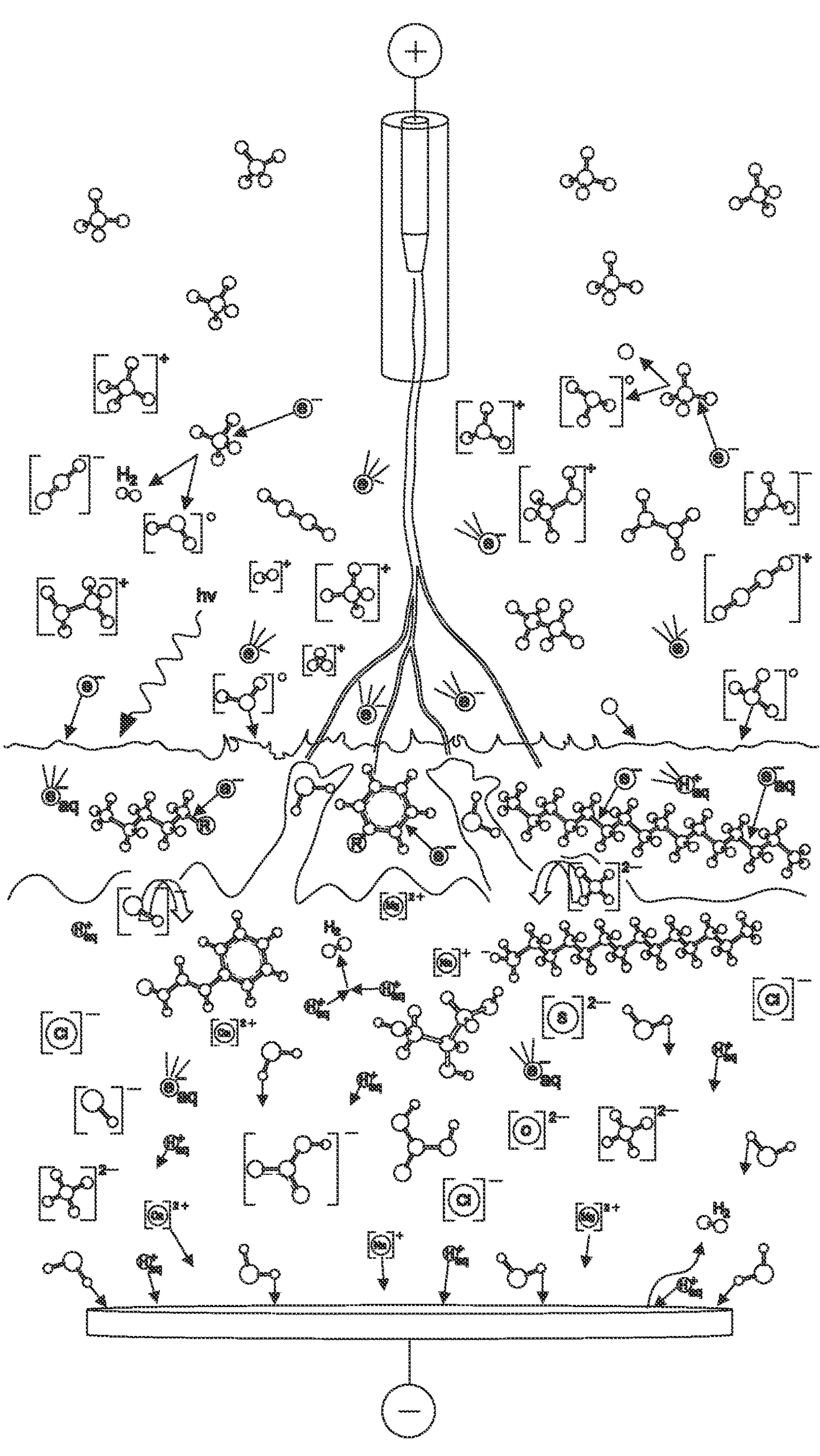
FIG. 6 depicts plasma-chemical processes occurring in a plasma electro-coalescence reactor, according to various potential embodiments.

FIG. 6 illustrates various chemical and physical processes which can occur in the multiphase plasma discharge process, according to various potential embodiments. An electric discharge is generated in a gas above a liquid surface (e.g., by a controller instructing a power supply). The liquid may comprise oil and water. A first electrode (or a plurality of electrodes) is in the gas phase, a second (or multiple) electrodes are in the liquid phase. A high voltage (e.g., 1 kV to 50 kV or 10 kV to 40 kV, or 20 kV to 30 kV) differential is applied between the electrodes to generate a non-thermal, non-equilibrium plasma discharge in the gas space above the liquid. The plasma discharge may be transiently pulsing, nanosecond pulsing, a low current DC discharge, etc. This configuration may also apply a significant electric field and a small current to the multiphase liquid. Charged bodies with the liquid (include solid particles, oil and water droplets) are electro-hydraulically, electrophoretically, and through entrainment convected through the liquid due to the applied electric forces. The high electric field, and the resulting plasma generation, lead to primary plasma-chemical reactions in the gas phase (e.g., by the stripping of hydrogen from methane or other molecules and the recombination thereof), primary plasma-chemical reactions at the gas-liquid interface, and secondary plasma-chemical reactions within the liquids. Electrochemical reactions may also be initiated at the second electrode based on the application of voltage thereto, which may be similar or different (e.g., less pronounced) than at the first electrode. In the plasma phase, free electrons can initiate low temperature plasma-chemical reactions; these may include the formation of atomic hydrogen, the formation of methyl radicals, and the formation of hydroxyl radicals as well as various other vibrationally and electronically excited species, negative and positive ions, and energetic photons. These reactive species impact onto the liquid surface reacting with water and oil molecules. These reactive species also may transport into the liquid becoming aqueous active species, radicals and ions. In the liquid phase these species may further transform into other radical and reactive neutral species, charged species, and complexes. Many potential reaction chemistries can occur in these configurations. The complex water, oil, and gas mixtures allows for a huge variety of accessible potential compounds. The low temperature non-thermal non-equilibrium plasma provides the activation energy (directly or indirectly) to facilitate the formation of various non-ionic surfactants, anionic surfactants, switterion surfactants, lippophillic groups, amophoteric surfactants, cationic surfactants, or previously undiscovered or unnamed surfactants. Synthesized from heterogeneous media, the chemical structure and synthesized compounds can be very heterogeneous, containing hydrophilic and hydrophobic groups. Various polyols and other synthetic polymers can also be synthesized which may act as demulsifiers. In one example a plasma generated OH molecule reacts with a complex hydrocarbon molecule ($C_xH_y$) in the oil phase, reacting to form an unsaturated and oxidized hydrocarbon molecule similar in structure to a non-ionic surfactant like trans-cinnamaldehyde. In another example the produced water contains salt ions (e.g. sodium) and sulfate ions, reactive species from the plasma reaction with the oil causing chain scission of the oil molecule, the long chain radical product reacts with sulfate ions in the water solution to produce a molecule similar to sodium laureth sulphate.

These plasma synthesized surfactant and demulisification molecules may be in solution (e.g., may appraoch being in perfect solution) and may be highly miscible. The uniqueness of having a surfactant and demulisication water solution synthesized from the crude oil itself will serve as an optimized or otherwise "custom made" surfactant to use for that crude oil and reservoir, as compared to engineered surfacants that may have lower effectiveness and/or efficiency by virtue of, for example, changes in the crude oil that enters the reactor over time and estimations (and potentially guess work) that are otherwise involved. This plasma enhanced water not only is an optimized or customized surfactant for any specific crude oil and reservoir when synthesized from the crude oil itself, but it also is a two-in-one water solution, with demulisifcation molecules to reduce foaming, enhance separation, and enhance crude oil and water separation during production, leading to a reduction in retention time (i.e., time needed in the reactor) and higher revenues for operators. Commerically added surfactant and water solutions during the separation and injection process may be poorly formulated for the specific produced oil and water and thus be highly immiscible, leading to poor recoveries and high costs in chemicals.

The water that leaves the processing reactor may exhibit improved properties with respect to enhanced oil recovery (and similar operations) compared to produced water from the well or other water entering the reactor. The plasma that hits the surface of the crude oil and water mixture depositing energy and charge to synthesize and activate surfactant and demulsification molecules to provide efficient oil mobility during subterranean enhanced oil recovery waterflooding operations.

Figure 7:
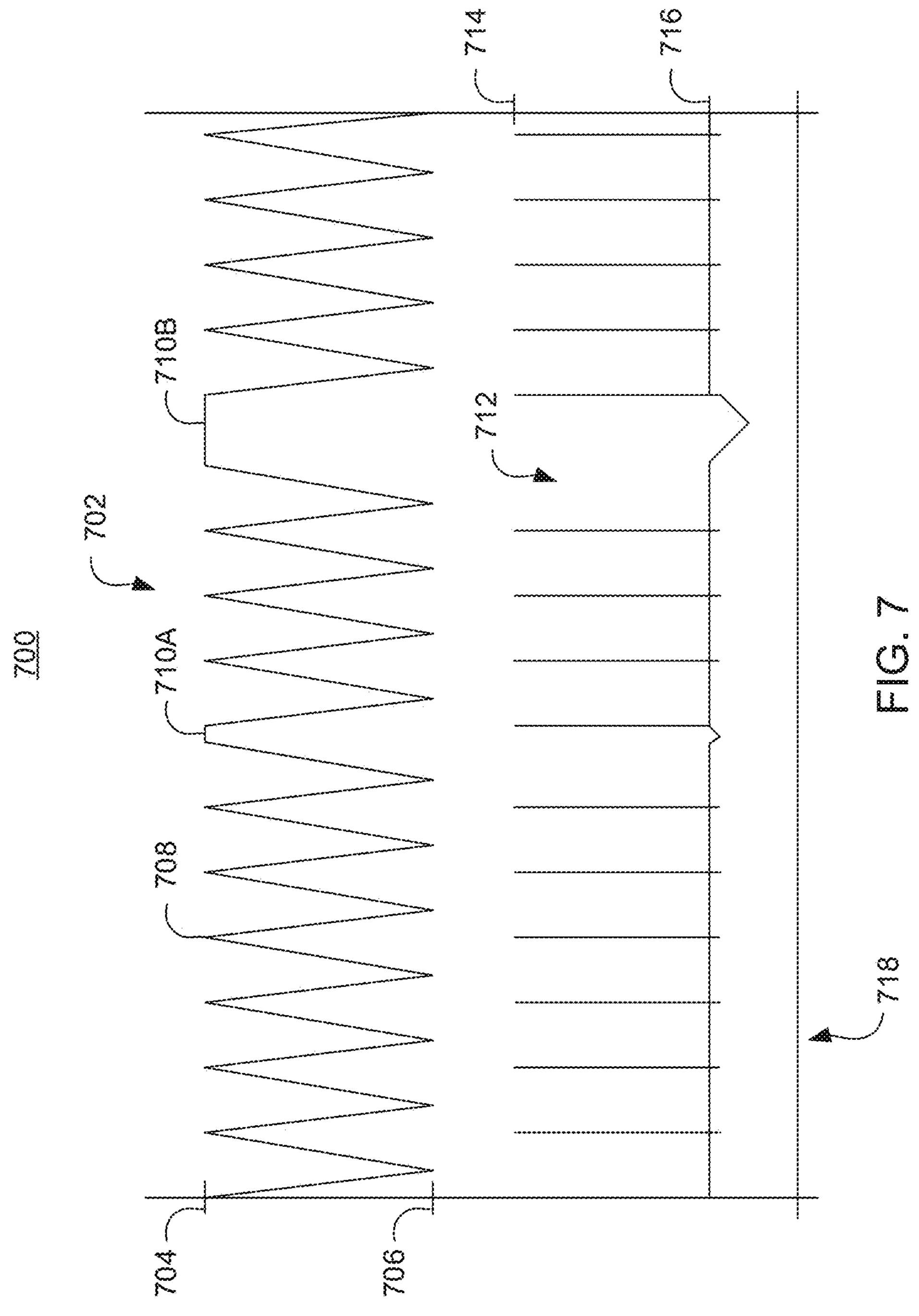
FIG. 7 depicts a voltage-current relationship for electrodes of a plasma electro-coalescence reactor, according to various potential embodiments.

FIG. 7 depicts a voltage-current relationship 700 supplied by an energy source to electrodes of a reactor over a time axis 718. For example, the reactor can include the reactor 200 of FIG. 2. A voltage curve 702 depicts a voltage between electrodes, which may vary between a local maximum value 704 (e.g., about 25 kV) and a local minimum value 706 (e.g., about 15 kV). Such a voltage can vary according to electrode or reactor geometry, headspace pressure, composition of an emulsified mixture and the like. A current curve 712 can correspond to the voltage curve 702. For example, one or more local maximums 708 of the voltage can correspond to a breakdown of a non-oxidizing gas disposed between respective electrodes of a reactor. Such a breakdown can result in a plasma pulse corresponding with an increase in current supplied between a leakage current 716 and an emission current 714. Responsive to the increase in current (e.g., upon a detection thereof or a depletion of energy stored at a capacitor of the energy source), the energy source can lower a voltage to a local minimum. An energy storage device (e.g., capacitor) may recharge until a further dielectric breakdown.

In some embodiments, an energy source can supply a fixed voltage waveform configured to provide plasma emissions. In some embodiments, a breakdown may be detected by the energy source. For example, at a first period of a sustained local maximum 710A, a maximum voltage is maintained until an increase in current output, indicative of a plasma discharge, is detected. Likewise, at a second period of a sustained local maximum 710B, the maximum voltage is maintained until an increase in current output is detected. The frequency of the voltage signal can be adjusted, for example, to a value such as 1 Hz, 10 Hz, 100 Hz, 1 kHz, or the like. A preferred range is 50 Hz to 200 Hz for appropriate power density and reactor compactness in various embodiments. The discharge may contribute energy to the reactor fluid. For example, a specific energy input of less than 20 kJ/kg, less than 10 kJ/kg, or less than 1 kJ/kg. Put differently, the energy employed to achieve separation may not impart significant energy to the reactor (resulting in less heating), such that the reactor may operate at or near an ambient temperature (e.g., less than 100 C, less than 50 C, or less than 30 C).

Figure 8:
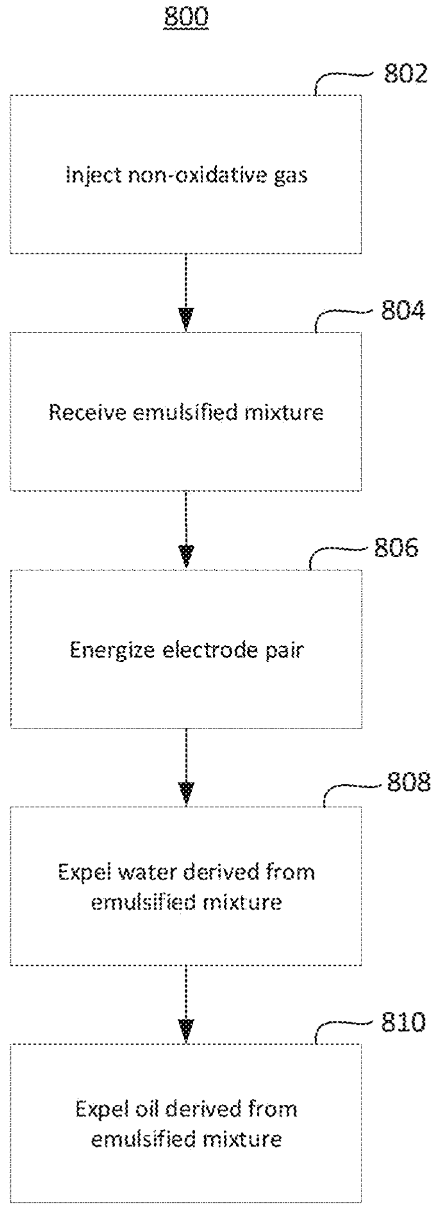
FIG. 8 discloses another method employing a plasma electro-coalescence reactor to disaggregate components of an emulsified mixture, according to various potential embodiments.

FIG. 8 discloses a method for the demulsification of oil-including emulsions or other mixtures. In brief summary, at operation 802, a reactor body is filled with non-oxidative gas. At operation 804, an emulsified mixture is received. At operation 806, an electrode set is energized. At operation 808, water is expelled from the emulsified mixture. Oil is expelled from the emulsified mixture at operation 810.

In further detail, at operation 802, a reactor body is filled with a non-oxidative gas. The non-oxidative gas can be received in a headspace of the reactor body above a material such as an emulsified mixture contained therein (e.g., subsequent to operation 804), or may occupy the whole reactor body (e.g., prior to operation 802), or may be recovered continuously (e.g., responsive to a pressure or flow rate of the reactor which may be concurrent with operation 804). The non-oxidative gas can displace an oxidative gas such as oxygen (e.g., via a gas outlet port, seam, gasket leakage, or the like). In some embodiments, the non-oxidative gas can be maintained at a pressure in excess of atmospheric pressure, such that the positive pressure prevents an ingress of other gas. In some embodiments, a pressure regulator disposed on a gas output port or gas input port of the reactor body may adjust a flow rate of gas into or out of the reactor body to maintain a pressure at no less than a lower threshold and no higher than an upper threshold. In some embodiments, the lower threshold or the upper threshold may be adjusted to adjust a flow rate of an emulsified mixture such as to maximize throughput according to a separation thereof. For example, a flow rate of 5 liters per minute, 50 liters per minute, or 500 liters per minute can be selected and the number of electrodes and size of reactor scaled such that the specific energy input is appropriate (as discussed above) and the flow rate meets the local processing requirements needs.

In further detail, at operation 804, an emulsified mixture is received into a first port of the reactor body. The emulsified mixture can be received at a same or different port as the emulsified mixture. For example, the emulsified mixture can include entrained non-oxidative gasses. The emulsified mixture can include oil, water, salts, sediments, and the like. Water of the emulsified mixture can include water which is generated by processes in the reactor. For example, the water can circulate between the reactor and a source of the emulsified mixture such as a storage facility, pipeline, oil reservoir, or the like. Such water can include treated water which is further described with regard to operation 808. The emulsified mixture can be received continuously during the method 800, such as for a continuous process, or as a discrete operation such as for a batch process. In some embodiments, the emulsified mixture can include water, and/or water can be added to the emulsified mixture in situ (e.g., waterflooding may be employed).

In further detail, at operation 806, a pair of electrodes are energized to a voltage in excess of a breakdown voltage of the non-oxidative gas. A first electrode can refer to an electrode disposed in the headspace of the reactor body. A second electrode can refer to an electrode disposed below the emulsification received at operation 804, or a constituent portion thereof such that a gas-liquid interface (e.g., gas-emulsion interface) intermediates the first and second electrodes. According to some implementations, a liquid portion (e.g., the emulsion) can vary from the voltage of the first electrode based on the voltage of the second electrode. The breakdown of the headspace gas can be a branched complete breakdown (also called a streamer or a streamer-corona or a corona-glow transition) herein the surface of the liquid is generally perpendicular to the breakdown direction. The surface of the liquid can have a same, substantially similar, or substantially different voltage as the second electrode according to a conductivity of the emulsified mixture.

Each of the first or second electrodes can include one or more connections to a voltage source or other power supply. Each of the first or second electrodes can include points or a surface which is parallel to an emulsified mixture or other liquid of the reactor. In some embodiments, each point can be a separate electrode. For example, the first electrode can include one or more points (e.g., spikes, tubes, bulges, or other protrusions) which extend towards the second electrode. Upon an application of voltage between the first and second electrodes, the points can generate plasma towards the second electrode (e.g., towards the gas-liquid interface). In some embodiments, a reactor can employ multiple first or second electrodes. Such electrodes can be energized at a same or different voltage, or at a same or different time (e.g., in-phase or out of phase). The reactor can include or interface with one or more voltage sources. The voltage source can energize an electrode pair to a voltage exceeding the breakdown voltage of the non-oxidative gas. For example, the voltage source can provide a pre-determined voltage based on an expected breakdown voltage of the non-oxidative gas, or increase voltage until a dielectric breakdown is detected or anticipated (see, e.g., the discussion of FIG. 7) and thereafter adjust a voltage of the electrodes as needed. For example, the voltage source can generate pulses of dielectric breakdown to cause a generation of plasma between the first electrode and the second electrode, generate an electric field between the electrodes including an intermediate surface of a liquid of the reactor. The plasma may transfer an electrical charge to a liquid (e.g., emulsion, water, or oil) of the reactor. The application of the plasma, the electric field, and the like may cause a separation of the emulsion, such as a separation of water and oil from the emulsion. Sediments or soluble components such as dirt, salt, or the like may also separate from the emulsion.

In further detail, at operation 808, a port of the reactor expels water therefrom. The chemical interactions with the plasma, and the electro-coalescence in the reactor can disaggregate the water from the emulsified mixture prior to expulsion from the reactor. The reactor can expel the water from a same or different port as the oil, sediments or other components of the emulsified mixture. The water can exit via one or more openings of a weir, or a port of the reactor disposed prior to advancing over, through, or under the weir. For example, a port disposed below a rag layer of a reactor can expel water, sediment, and the like. According to some embodiments, the reactor can recycle water to maintain a fluid level, or to introduce treated water to an emulsified mixture (e.g., to cause a separation thereof, such as in combination with the plasma reactor). The fluid level can be adjusted according to a desired breakdown voltage. According to some embodiments, the water can be recirculated through the reactor, or introduced (e.g., pumped) into an oil or gas reservoir, storage tank, or otherwise retained or transferred for use. For example, the treated water can be introduced to a reservoir as an antiseptic agent responsive to a presence of bacteria or other organisms, or responsive to a flow rate of oil from the reservoir (e.g., may be introduced to extend a lifetime of a well responsive to a production therefrom).

In further detail, at operation 810, the reactor expels oil therefrom. The reactor can disaggregate the oil from the emulsified mixture prior to expulsion from the reactor. For example, oil exiting the reactor may comprise less than 5% BSS, less than 1% BSS, or less than 0.5% BSS. A flow rate of the emulsified mixture into the reactor, or of the oil from the reactor, can be based on a detected or inferred BSS content. For example, the BSS content of the oil can be detected or inferred in situ in the reactor, or subsequent to its expulsion from the reactor (e.g., using or based on data from one or more sensors). Oil can be expelled from the reactor, tested, and a flow rate of the reactor can thereafter be adjusted to maintain an average BSS content for a quantity of oil greater than the quantity of oil available in the mixture in the reactor. According to some embodiments, the oil can exit through a port separate from a port from which water is expelled at operation 808. For example, operations 808 and 810 can be performed concurrently, The various operations discussed herein can be performed in various sequences including the simultaneous operations of one or more operations.

Figure 9A:
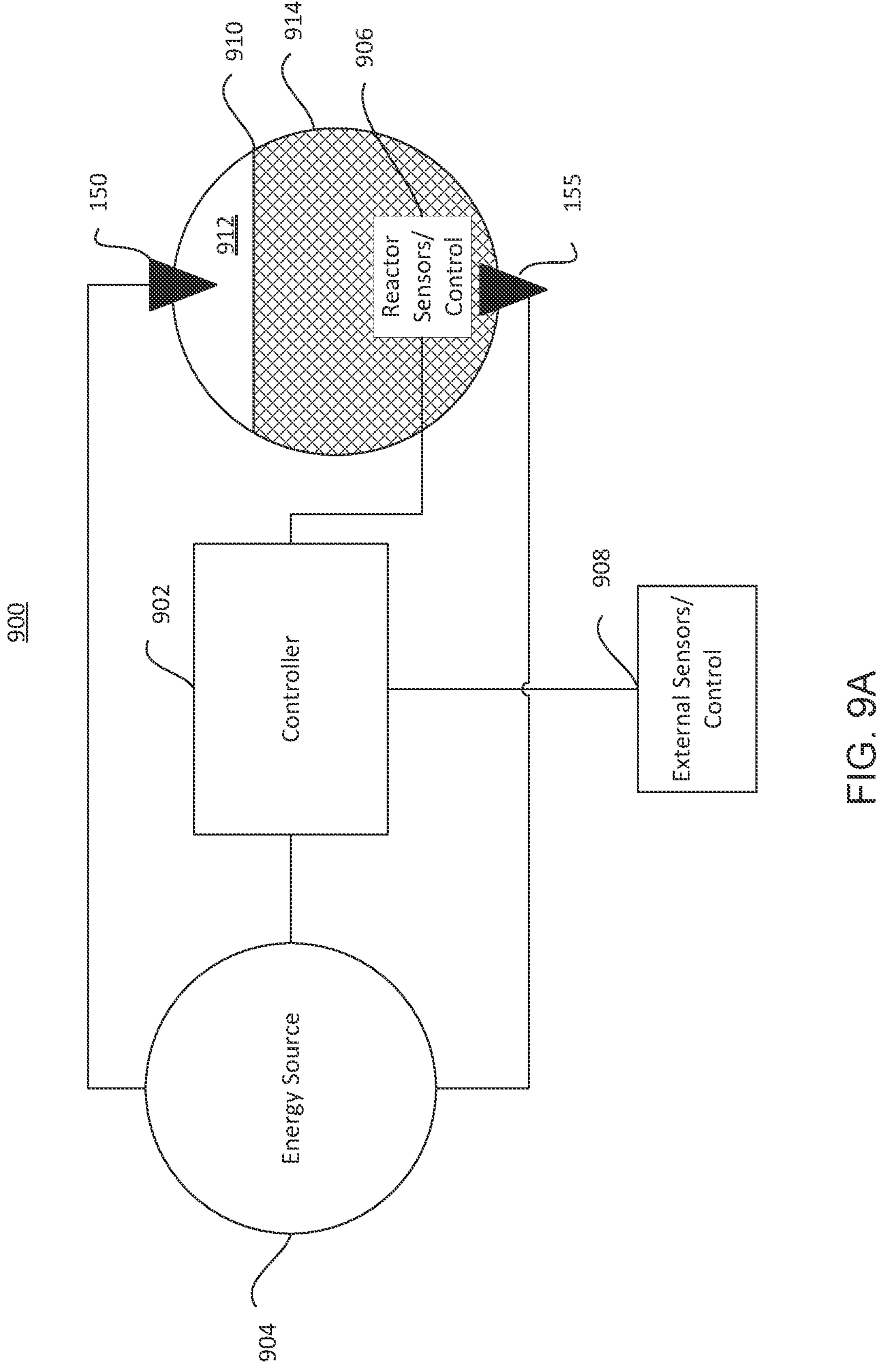
FIGS. 9A and 9B disclose a system including a plasma electro-coalescence reactor, according to various potential embodiments.

FIG. 9A discloses a system 900 including a plasma electro-coalescence reactor 200, according to various potential embodiments. The system 900 can include a controller 902 comprising various circuitry, such as one or more processors configured to perform operations discussed in the present disclosure, and a memory device (e.g., a non-volatile memory comprising instructions that, when executed by the one or more processors, cause the one or more processors to execute the various operations). For example, the one or more processors can be configured for, and/or the instructions can include, the actuation of various valves, motors, or the like to operate the reactor 100, the receipt or processing (e.g., comparison between or to a threshold) of sensor data, the actuation of an energy source 904, or the like. For example, the controller can adjust the various ports of the reactor 100 to set a level of a liquid-gas boundary 910 between a headspace 912 of the reactor 100 and any reactor fluid, sediment, or the like.

The controller 902 can interface with one or more energy sources 904. For example, the controller 902 can define a periodicity or magnitude of a voltage generation of the energy source 904. Such a periodicity or magnitude can be based on a dielectric breakdown voltage of the non-oxidative gas and the geometry of the reactor 100 or a headspace 912 thereof. The energy source may be connected to at least a first 150 and a second 155 electrode of at least one reactor 100. The controller 902 can interface with various sensors within or coupled to the reactor 906. The controller 902 can determine a position of the headspace based on a depth sensor such as a float sensor, a capacitive sensor, or a reflected light sensor (e.g., infrared sensor). The controller 902 can determine a flow rate via a mass flow sensor, a velocity sensor, a pressure gradient or differential, or the like (e.g., via a pressure sensor). The controller 902 can determine an oxygen content via an oxygen sensor. The controller 902 can adjust a valve, pump, weir, or the like to maintain an level of an emulsified mixture or a component thereof. Indeed, the controller can interface with various sensors to determine or adjust any operation discussed herein.

The controller 902 can interface with a plurality of sensors or controls exterior to the reactor 908. For example, the controller can interface with downpipe pressure sensors, temperature sensors, downpipe pumps, distribution pumps or the like. For example, the controller can determine a waterflood amount based on a viscosity or flow rate of the downpipe emulsified mixture, prior to entry to the reactor 100. The controller can interface with various sensors associated with processing of oil or water subsequent to exiting a reactor 100. For example, the controller 902 can adjust a flow rate responsive to a holding capacity of a storage tank, or a pressurization associated with a connection between a reactor port and another device. In some embodiments, the controller can include one or more processors connected by a wired or wireless network to interface with one or more reactors. For example, the controller 902 can interface with a plurality of reactors 100. As depicted, the reactor can include or receive an emulsified mixture 914.

Figure 9B:
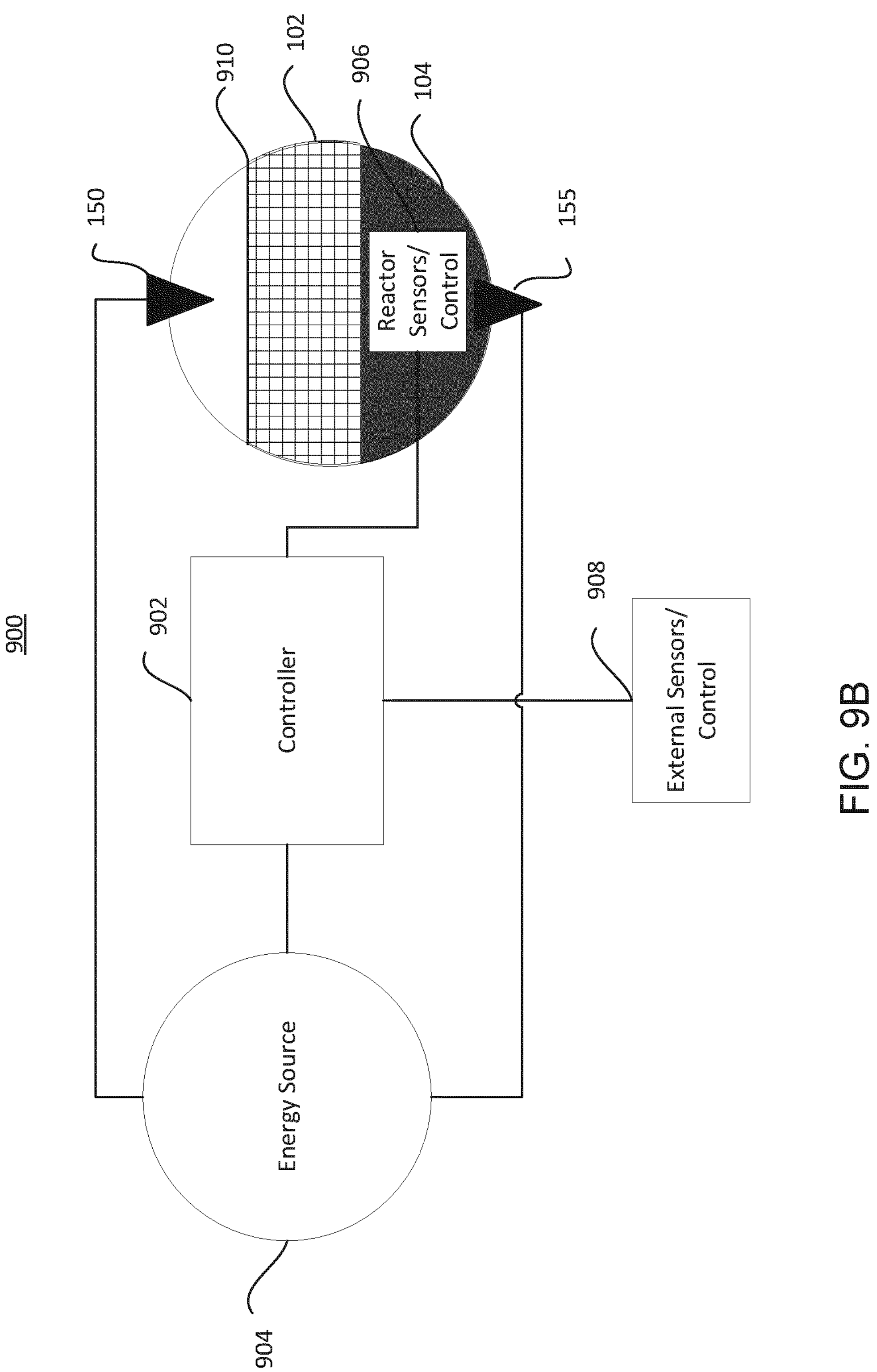

FIG. 9B discloses a system 900 including a plasma electro-coalescence reactor 200, according to various potential embodiments. For example, the system of 9B can depict a same system of FIG. 9A wherein reactor 100 has separated the emulsified mixture 914 to form an oil layer 102 and a water layer 104, as is described with further regard to FIG. 1 or throughout the present specification. In some embodiments, a portion of the emulsified mixture 914 can form a rag layer 106.

Embodiments of the apparatuses and processes thus generally described above, may be better understood by reference to the Appendix, which provides additional details on features of various potential embodiments of the inventive aspects disclosed herein, and is not intended to be limiting of the apparatuses or processes described above in any manner.

For the purposes of this disclosure and unless otherwise specified, "a" or "an" means "one or more." The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and processes within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular processes, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group, with regard to the reactor design, the chemical species thereof, etc.

As will be understood by one skilled in the art, for any and all purposes, particularly in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into sub-ranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

Some sample embodiments are disclosed below, in order to represent illustrative embodiments, which one skilled in the art will understand may be further modified, combined, constrained, etc. according to the entirety of this disclosure.

Embodiment AA: A method comprising: feeding a non-oxidative gas into a headspace of a reactor; receiving an emulsified mixture into the reactor; energizing a set of electrodes to a voltage at or in excess of a breakdown voltage of the non-oxidative gas to separate oil and water from the emulsified mixture, wherein a first electrode of the set of electrodes is disposed in the headspace of the reactor; removing the oil and/or the water from the reactor.

Embodiment AB: Any of the embodiments disclosed herein (e.g., Embodiment AA) wherein removing the water from the reactor comprises pumping the water separated from the emulsified mixture via a port of the reactor.

Embodiment AC: Any of the embodiments disclosed herein (e.g., Embodiment AA or AB) further comprising mechanically separating the oil and the water from the emulsified mixture.

Embodiment AD: Any of the embodiments disclosed herein (e.g., any of embodiments AA to AC) wherein mechanically separating the oil and the water from the emulsified mixture comprises using a weir.

Embodiment AE: Any of the embodiments disclosed herein (e.g., any of embodiments AA to AD) wherein the emulsified mixture comprises crude oil or crude oil and water that is naturally produced with the oil.

Embodiment AF: Any of the embodiments disclosed herein (e.g., any of embodiments AA to AE) wherein the non-oxidative gas originates in an oil well, and is recirculated within the reactor to maintain a desired pressure range.

Embodiment AG: Any of the embodiments disclosed herein (e.g., any of embodiments AA to AF) wherein the non-oxidative gas is natural gas.

Embodiment AH: Any of the embodiments disclosed herein (e.g., any of embodiments AA to AG) wherein the emulsified mixture is injected into the reactor at a temperature that is below 100 degrees Celsius.

Embodiment AI: Any of the embodiments disclosed herein (e.g., any of embodiments AA to AH) wherein energizing the set of electrodes comprises energizing the first electrode and a second electrode, wherein the second electrode is not in the headspace of the reactor.

Embodiment AJ: Any of the embodiments disclosed herein (e.g., any of embodiments AA to AI) wherein the first electrode does not extend into the emulsified mixture and the second electrode extends into the emulsified mixture.

Embodiment AK: Any of the embodiments disclosed herein (e.g., any of embodiments AA to AJ) further comprising mechanically separating the oil and the water from the emulsified mixture.

Embodiment AL: Any of the embodiments disclosed herein (e.g., any of embodiments AA to AK) further comprising mechanically separating the oil and the water from the emulsified mixture using a weir.

Embodiment BA: A system comprising a reactor, the reactor comprising: a set of ports configured to (i) receive an emulsified mixture into the reactor, (ii) receive a non-oxidative gas into the reactor, (iii) expel oil from the reactor, and (iv) expel water from the reactor; and a set of electrodes comprising a first electrode in a headspace of the reactor, and a second electrode, the set of electrodes configured to receive a voltage at or in excess of a breakdown voltage of the non-oxidative gas.

Embodiment BB: Any of the embodiments disclosed herein (e.g., Embodiment BA) wherein the second electrode is not in the headspace of the reactor.

Embodiment BC: Any of the embodiments disclosed herein (e.g., Embodiment BA or BB) wherein the set of ports comprises a first port configured to feed the emulsified mixture into the reactor, and a second port configured to feed the non-oxidative gas into the reactor.

Embodiment BD: Any of the embodiments disclosed herein (e.g., any of embodiments BA to BC) wherein the set of ports includes a third port configured to expel the oil from the reactor, and a fourth port configured to expel the water from the reactor.

Embodiment BE: Any of the embodiments disclosed herein (e.g., any of embodiments BA to BD) further comprising a pressure regulator configured to adjust a flow rate of gas entering or being expelled from the reactor to maintain a pressure range of the headspace of the reactor based on a pressure threshold.

Embodiment BF: Any of the embodiments disclosed herein (e.g., any of embodiments BA to BE) wherein the first electrode comprises a plurality of points extending towards the second electrode.

Embodiment BG: Any of the embodiments disclosed herein (e.g., any of embodiments BA to BF) wherein the second electrode comprises openings configured to pass an emulsified mixture there-through.

Embodiment BH: Any of the embodiments disclosed herein (e.g., any of embodiments BA to BG) further comprising a weir comprising: an upper surface to allow a passage of the oil over the upper surface; a blocking surface configured to interface with a rag layer; and an opening configured to pass the water, the opening disposed below the blocking surface.

Embodiment BI: Any of the embodiments disclosed herein (e.g., any of embodiments BA to BH) wherein a height of at least a portion of the weir is adjustable from an exterior surface of the reactor.

Embodiment BJ: Any of the embodiments disclosed herein (e.g., any of embodiments BA to BI) configured to perform any of the methods of embodiments AA through AI.

Embodiment CA: A system, comprising a reactor comprising a set of ports configured to (i) receive an emulsified mixture into the reactor, (ii) receive a non-oxidative gas into the reactor, (iii) expel oil from the reactor, and (iv) expel water from the reactor; and a set of electrodes comprising a first electrode in a headspace of the reactor, and a second electrode, the set of electrodes configured to receive a voltage at or in excess of a breakdown voltage of the non-oxidative gas; and an energy source, comprising: a first terminal electrically connected to the first electrode; and a second terminal electrically connected to the second electrode; wherein the energy source is configured to generate the voltage between the first terminal and the second terminal in excess of a dielectric breakdown of the non-oxidative gas in the headspace of the reactor.

Embodiment CB: Any of the embodiments disclosed herein (e.g., Embodiment CA) wherein the energy source is configured to alternate between the voltage in excess of the dielectric breakdown of the non-oxidative gas, and a second voltage which is less than the dielectric breakdown of the non-oxidative gas at a frequency of at least 1 Hz.

Embodiment CC: Any of the embodiments disclosed herein (e.g., Embodiment CA or CB) comprising a pressure regulator configured to adjust a flow rate of gas received by or expelled from the reactor to maintain a pressure of the headspace of the reactor based on a pressure range.

Embodiment CD: Any of the embodiments disclosed herein (e.g., any of embodiments CA through CC) configured to perform any of the methods of embodiments AA through AI.

What is claimed is:

1. A reactor comprising:

a vessel;

a first port configured to receive an emulsified mixture into a liquid space of the vessel;

a second port configured to receive a gas into a headspace of the vessel;

one or more outlets configured to discharge liquids from the vessel;

a first electrode disposed in the headspace of the vessel, and a second electrode disposed in the liquid space of the vessel, the first and second electrodes having an interelectrode gap spanning the headspace and the liquid space such that a gas-liquid interface lies between the electrodes during operation;

a sensor configured to detect an electrical condition indicative of dielectric breakdown of gas in the interelectrode gap, the electrical condition comprising a change in at least one of electrode current or electrode voltage;

an electrical connection configured to interface to an energy source to receive a voltage waveform to generate a plasma discharge between the first and second electrodes across the gas-liquid interface during operation; and a controller operatively coupled to the energy source and to the sensor and configured to modulate the voltage waveform between a magnitude in excess of a breakdown voltage of the gas in the interelectrode gap and a magnitude below the breakdown voltage of the gas in the interelectrode gap, thereby maintaining a plasma discharge across the gas-liquid interface.

2. The reactor of claim 1, wherein the reactor is configured such that, in operation with the liquid and the gas in the reactor, the first electrode is surrounded by gas and the second electrode is immersed in liquid when electrical current flows between the first electrode and the second electrode while the first and second electrodes receive the voltage waveform.

3. The reactor of claim 1, wherein the second port extends through an upper surface of the reactor to feed the gas down into the vessel from above.

4. The reactor of claim 1, wherein the one or more outlets includes a third port, configured to expel oil from the vessel, and a fourth port, separate from the third port, configured to expel water from the vessel.

5. The reactor of claim 1, further comprising:

a pressure regulator configured to adjust a flow rate of gas entering or being expelled from the vessel during operation to maintain a gas pressure range in the gas space of the vessel based on a pressure threshold.

6. The reactor of claim 1, wherein the first electrode comprises a plurality of points extending towards the second electrode.

7. The reactor of claim 1, wherein the second electrode comprises openings configured to pass the liquid therethrough.

8. The reactor of claim 1, further comprising a weir comprising:

an upper surface to allow a passage of oil over the upper surface;

a blocking surface configured to interface with a rag layer; and an opening configured to pass water, the opening disposed below the blocking surface.

9. A system, comprising:

a reactor with a vessel, the reactor comprising:

a first port configured to receive an emulsified mixture into the vessel of the reactor such that the emulsified mixture contacts the vessel when the emulsified mixture is added to the vessel, the first port situated at a first height;

a second port configured to receive a non-oxidative gas into the vessel at a pressure in excess of an ambient pressure;

one or more additional ports configured to expel oil from the vessel and expel water from the vessel; and a set of electrodes comprising a first electrode situated at a second height that is above the first height so as to position the first electrode in a gas space of the vessel, and a second electrode separated from the first electrode by a gap, the second electrode situated at a third height that is below the first height to position the second electrode in a liquid space of the vessel that is below the gas space of the vessel, the set of electrodes configured to receive a voltage across the gap;

a sensor configured to detect an electrical condition indicative of dielectric breakdown of gas in the gap, the electrical condition comprising a change in at least one of electrode current or electrode voltage;

a controller; and an electrical connection comprising a first terminal electrically connected to the first electrode and a second terminal electrically connected to the second electrode, wherein the first and second terminals are configured to interface with an energy source that is configured to generate the voltage between the first terminal and the second terminal in excess of a dielectric breakdown of the non-oxidative gas in the gas space of the vessel;

wherein the reactor is configured such that, in operation with the emulsified mixture and the non-oxidative gas in the reactor, application of the voltage between the first electrode and the second electrode generates a plasma discharge in the gas space above the liquid space; and wherein the controller is operatively coupled to the electrical connection and to the sensor, the controller being configured to modulate the voltage across the gap between a magnitude in excess of a breakdown voltage of the gas in the gap and a magnitude below the breakdown voltage of the gas in the gap, thereby maintaining a plasma discharge across a gas-liquid interface between the first electrode and the second electrode during operation.

10. The system of claim 9, wherein the voltage is a first voltage, and wherein the energy source is configured to alternate, at a frequency of at least 1 Hz, between the first voltage and a second voltage which is less than the dielectric breakdown of the non-oxidative gas.

11. The system of claim 9, comprising a pressure regulator configured to adjust a flow rate of gas received by or expelled from the vessel during operation to maintain a gas pressure in the gas space of the vessel based on a pressure range.

12. The reactor of claim 1, wherein the first electrode is diametrically opposite the second electrode along an axis;

wherein the first port is on a first side of the axis; and wherein the one or more outlets are on a second side of the axis opposite the first side.

13. The reactor of claim 12, wherein the axis extends along a plane perpendicular to a plurality of points of the first electrode, and parallel to a member of the first electrode mechanically coupling the plurality of points, and wherein the axis is disposed medially across the gap.

14. The reactor of claim 13, wherein the plane extends along an interface between the emulsified mixture and the gas in the gas space, the first port configured to receive a quantity of the emulsified mixture to fill the reactor to the plane.

15. The reactor of claim 1, further comprising a weir that sets a liquid-gas interface height in the vessel such that liquid received into the vessel cannot fill the vessel above the liquid-gas interface height, wherein the first electrode is positioned above the liquid-gas interface height and the second electrode extends below the liquid-gas interface height such that, in operation, the first electrode is positioned in the gas space without being immersed in the liquid while the second electrode is immersed in the liquid in the vessel.

16. The system of claim 9, wherein the first electrode is diametrically opposite the second electrode along an axis, and wherein the axis extends along a plane perpendicular to a plurality of points of the first electrode, and parallel to a member of the first electrode mechanically coupling the plurality of points.

17. The system of claim 16, wherein the plane extends along an interface between the emulsified mixture and the non-oxidative gas in the gas space, the first port configured to receive a quantity of the emulsified mixture to fill the reactor to the plane.

18. A system comprising a reactor with a vessel formed of a non-conductive material, the reactor comprising:

a set of ports configured to (i) receive a liquid into the vessel, (ii) receive a gas into the vessel, (iii) expel oil and water from the vessel;

a set of electrodes comprising a first electrode at a first height and a second electrode at a second height that is lower than the first height, the set of electrodes configured to receive a voltage at or in excess of a breakdown voltage of a non-oxidative gas;

a weir that sets a liquid-gas interface height in the vessel such that the liquid received in the vessel cannot fill the vessel above the liquid-gas interface height, wherein a gas space of the vessel is situated above the liquid-gas interface height, wherein the first electrode is situated in the gas space such that the first electrode is surrounded by gas without extending into the liquid in the vessel, and wherein the second electrode is situated below the liquid-gas interface height so as to immerse the second electrode in the liquid in the vessel when the reactor is in operation;

a sensor configured to detect an electrical condition indicative of dielectric breakdown of gas in an interelectrode gap between the first and second electrodes, the electrical condition comprising a change in at least one of electrode current or electrode voltage;

an electrical connection configured to interface to an energy source to provide the voltage to the first and second electrodes; and a controller operatively coupled to the sensor and to the electrical connection, the controller configured to modulate the voltage between a magnitude in excess of the breakdown voltage of the gas in the interelectrode gap and a magnitude below the breakdown voltage of the gas in the interelectrode gap, thereby maintaining a plasma discharge across a gas-liquid interface between the first and second electrodes.

19. The reactor of claim 1, wherein the controller is further configured to energize different electrodes out of phase with one another to spatially and temporally distribute gas-phase discharges over a surface of the liquid.

* * * * *